US012425755B2

(12) United States Patent
Giuliani et al.

(10) Patent No.: US 12,425,755 B2
(45) **Date of Patent: *Sep. 23, 2025**

(54) WIRELESS AUDIO SYSTEMS

(71) Applicant: Apple Inc., Cupertino, CA (US)

(72) Inventors: Vincenzo Giuliani, Thousand Oaks, CA (US); David Jeon, Simi Valley, CA (US); Gabriel Sanchez, Hawthorne, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,479

(22) Filed: Feb. 26, 2024

(65) Prior Publication Data

US 2024/0196120 A1 Jun. 13, 2024

Related U.S. Application Data

(63) Continuation of application No. 17/238,192, filed on Apr. 22, 2021, now Pat. No. 11,943,575, which is a continuation of application No. 16/387,423, filed on Apr. 17, 2019, now Pat. No. 11,026,005, which is a continuation of application No. 15/813,015, filed on Nov. 14, 2017, now Pat. No. 10,284,934, which is a continuation of application No. 14/599,385, filed on Jan. 16, 2015, now Pat. No. 9,913,011.

(Continued)

(51) Int. Cl.
*H04R 1/00* (2006.01)

(52) U.S. Cl.
CPC ........... *H04R 1/00* (2013.01); *H04R 2420/07* (2013.01)

(58) Field of Classification Search
CPC .............................. H04M 3/568; H04M 9/082
See application file for complete search history.

(56) References Cited

U.S. PATENT DOCUMENTS 7,483,538 B2 1/2009 McCarty
8,554,133 B1 10/2013 Feldman et al.

(Continued)

FOREIGN PATENT DOCUMENTS

CA 2901604 A1 7/2014
CN 103199602 A 7/2013

OTHER PUBLICATIONS

NFC Forum Digital Protocol Technical Specification (dated Nov. 17, 2010).

*Primary Examiner* — Akelaw Teshale
(74) *Attorney, Agent, or Firm* — BAKERHOSTETLER

(57) ABSTRACT

A loudspeaker system can have first and second loudspeakers selectively operable in a single-channel mode or in a multi-channel mode. In the single-channel mode, the first and the second loudspeakers are configured to simultaneously reproduce a substantially identical signal. In the multi-channel mode, the first loudspeaker reproduces a first-channel signal and the second loudspeaker reproduces a second-channel signal. The first-channel signal and the second-channel signal can constitute respective portions of a multi-channel signal. Such loudspeaker systems can also have a mode selector configured to select one of the single-channel mode and the multi-channel mode. In some embodiments, such selection can occur in response to one or more detected proximities of another loudspeaker system. Multi-zone loudspeaker systems are also disclosed.

22 Claims, 14 Drawing Sheets

Related U.S. Application Data

(60) Provisional application No. 61/928,896, filed on Jan. 17, 2014.

(56) References Cited

U.S. PATENT DOCUMENTS

| | | | | |
|---|---|---|---|---|
| 8,788,080 | B1 * | 7/2014 | Kallai | H03G 3/3005 700/94 |
| 8,873,767 | B2 | 10/2014 | Regler | |
| 9,008,330 | B2 | 4/2015 | Sheen | |
| 9,014,834 | B2 | 4/2015 | Kallai et al. | |
| 9,202,509 | B2 | 12/2015 | Kallai et al. | |
| 9,288,596 | B2 | 3/2016 | Gossain et al. | |
| 9,715,365 | B2 | 7/2017 | Kusano | |
| 9,928,026 | B2 | 3/2018 | Kallai et al. | |
| 2007/0223725 | A1 | 9/2007 | Neumann | |
| 2008/0008338 | A1 | 1/2008 | Yoon et al. | |
| 2009/0079883 | A1 | 3/2009 | Banks | |
| 2010/0260348 | A1 | 10/2010 | Bhow | |
| 2010/0284389 | A1 | 11/2010 | Ramsay | |
| 2010/0299639 | A1 | 11/2010 | Ramsay | |
| 2011/0026717 | A1 | 2/2011 | Nakagawa | |
| 2011/0207396 | A1 * | 8/2011 | Spurgat | H04L 65/65 455/3.06 |
| 2012/0058727 | A1 | 3/2012 | Cook | |
| 2012/0263318 | A1 * | 10/2012 | Millington | G06F 3/165 381/107 |
| 2013/0089217 | A1 | 4/2013 | Kelloniemi | |
| 2013/0331970 | A1 | 12/2013 | Beckhardt | |
| 2013/0336504 | A1 | 12/2013 | Mosgaard | |
| 2013/0338804 | A1 | 12/2013 | Sheen | |
| 2014/0003629 | A1 | 1/2014 | Reilly | |
| 2014/0057569 | A1 | 2/2014 | Toivanen | |
| 2014/0079256 | A1 | 3/2014 | De Muynke et al. | |
| 2014/0140530 | A1 * | 5/2014 | Gomes-Casseres | H04B 7/00 381/77 |
| 2014/0140674 | A1 * | 5/2014 | Jallad | H04N 21/43637 386/200 |
| 2014/0219484 | A1 | 8/2014 | Zellner | |
| 2014/0256259 | A1 | 9/2014 | Tse | |
| 2014/0337426 | A1 | 11/2014 | Kulkarni | |
| 2014/0362995 | A1 * | 12/2014 | Backman | H04S 7/301 381/17 |
| 2015/0055781 | A1 | 2/2015 | Chen | |
| 2015/0090865 | A1 | 4/2015 | Calatayud | |
| 2015/0091691 | A1 | 4/2015 | Calatayud | |
| 2015/0092947 | A1 | 4/2015 | Gossain | |
| 2015/0289076 | A1 * | 10/2015 | Zhu | H04M 1/72442 381/300 |
| 2015/0324167 | A1 | 11/2015 | Calatayud | |
| 2016/0170707 | A1 * | 6/2016 | Petainen | G06F 3/0485 715/716 |

* cited by examiner

WIRELESS AUDIO SYSTEMS

CROSS-REFERENCE TO RELATED APPLICATIONS

This application, which is a continuation of U.S. patent application Ser. No. 17/238,192, filed Apr. 22, 2021, which is a continuation of U.S. patent application Ser. No. 16/387,423, filed Apr. 17, 2019 and issued as U.S. Pat. No. 11,026,005 on Jun. 1, 2021, which is a continuation of U.S. patent application Ser. No. 15/813,015, filed Nov. 14, 2017, now U.S. Pat. No. 10,284,934, which is a continuation of U.S. patent application Ser. No. 14/599,385, filed Jan. 16, 2015, now U.S. Pat. No. 9,913,011, which claims benefit of and priority to U.S. Patent Application No. 61/928,896, filed Jan. 17, 2014, the contents of each of which is hereby incorporated by reference as if recited in full herein for all purposes.

BACKGROUND

This application, and the innovations and related subject matter disclosed herein, (collectively referred to as the "disclosure") generally concern automatically configurable wireless systems, such as, for example, automatically configurable wireless media systems. In particular, but not exclusively, disclosed innovations pertain to methods of wirelessly connecting loudspeakers to sources of audio media and/or other loudspeakers, as well as to tangible, non-transient computer-readable media containing instructions that, when executed, cause a computing environment to perform such methods. In addition, specific embodiments of loudspeaker systems configured to wirelessly connect to a source of audio media and/or to other loudspeaker systems are also described. Although principles pertaining to automatically configurable wireless systems are described in relation to specific examples of wireless media systems, other embodiments of wireless systems can incorporate one or more of the disclosed principles without departing from the scope and the spirit of this disclosure. Such systems include, by way of example and not limitation, keyless entry systems, wireless multi-media systems, wireless biological monitoring systems, wireless gaming systems, wireless control systems, and so on.

Near Field Communication (NFC) is a standards-based connectivity technology that permits different computing environments, e.g., mobile wireless devices, point-of-sale systems, etc., to establish a two-way radio communication with each other when the computing environments are positioned in relatively close proximity to each other (i.e., less than several centimeters (cm), such as less than about 3 cm to about 4 cm, for example, less than about 2 cm and about 3 cm apart, with between about 0.5 cm and about 1.5 cm being but one particular example).

NFC standards pertain to communications protocols and data exchange formats, and are based on existing radio-frequency identification (RFID) standards including ISO/IEC 14443 and FeliCa. The standards include ISO/IEC 18092 and those defined by the NFC Forum.

Existing implementations of peer-to-peer NFC connections are convoluted and require substantial processing and memory resources. As a consequence, existing peer-to-peer NFC connections consume substantial amounts of power to service various types of NFC devices, including smartphones, point of sale payment systems, etc. Such methods are not conducive for small, embedded systems powered by battery, or other small embedded systems lacking a monolithic operating system software.

Thus, a need remains for a simplified approach for wirelessly and operatively coupling computing environments with each other using NFC or other communication protocols. There also remains a need for methods of wirelessly connecting loudspeakers to sources of audio media and/or other loudspeakers. In particular, but not exclusively, a need remains for wirelessly connecting independent loudspeakers to respective multi-channel audio sources. A need also remains for systems configured to wirelessly connect a plurality of independently operable loudspeakers to a single multi-channel audio source. Other deficiencies of existing technologies exist, as well; the foregoing list of deficiencies is intended to be a listing of several representative deficiencies in the prior art rather than an exhaustive listing.

SUMMARY

The innovations disclosed herein overcome many problems in the prior art and address one or more aforementioned or other needs. In some respects, innovations disclosed herein pertain to wireless audio systems. Nonetheless, other wireless systems can benefit from technologies and principles described herein.

The foregoing and other features and advantages will become more apparent from the following detailed description, which proceeds with reference to the accompanying drawings.

BRIEF DESCRIPTION OF THE DRAWINGS

The drawings briefly described below show embodiments of various aspects of the innovations disclosed herein, unless expressly identified as illustrating a feature from the prior art.

DETAILED DESCRIPTION

Innovative wireless systems are described by way of reference to specific examples of one or more loudspeaker systems configured to synchronously play audio from an audio media source.

OVERVIEW

Figure 1:
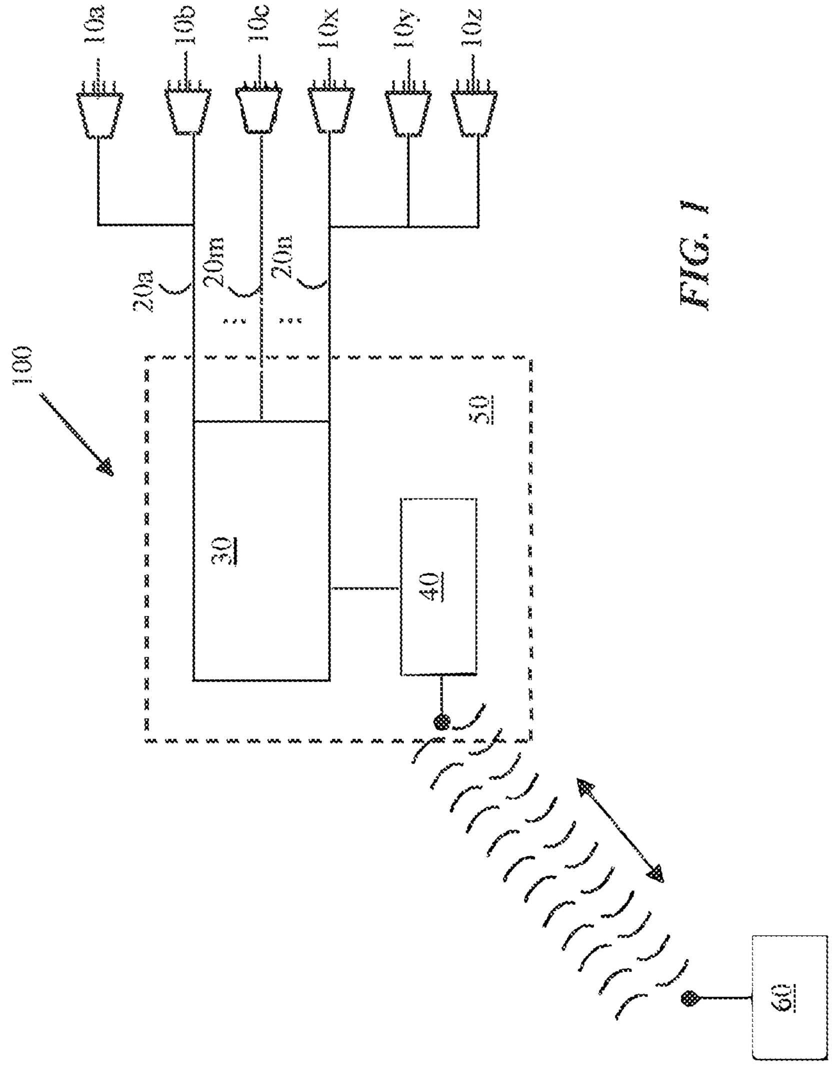
FIG. 1 schematically illustrates a media player in wireless communication with a loudspeaker system having a plurality of loudspeakers and a plurality of channels.

As shown in FIG. 1, a loudspeaker system can include a plurality of loudspeakers 10*a-z*. Each loudspeaker 10*a-z* in a given loudspeaker system can be operatively coupled to a corresponding amplifier channel 20*a-n*, allowing each loudspeaker to play audio corresponding to the respective channel. The PILL XL® loudspeaker system commercially available from Beats by Dr. Dre is but one example of such a loudspeaker system.

A so-called stereo input signal 62 can comprise a signal for a left channel 72 and a signal for a right channel 82. A selected loudspeaker system 200 of the type disclosed herein can include one or more loudspeakers 70*a,b* configured to reproduce audio from the left channel 72 of the amplifier 94 and one or more other loudspeakers 80*a,b* configured to reproduce audio from the right channel 82 of the amplifier. When a stereo (i.e., a two-channel) audio signal 62 passes through the amplifier 94 and the loudspeaker system 200 is set to a stereo mode, the speakers 70*a,b* coupled to the left channel 72 of the amplifier 94 play back the left-channel portion of the stereo signal 62, and the speakers 80*a,b* coupled to the right channel 82 of the amplifier 94 play back the right-channel portion of the stereo signal 62. When the loudspeaker system 200 is set to a "mono" mode, the left- and the right-channel signals are reproduced in their entirety on each of the left- and the right-channels 72, 82 of the amplifier, such that all loudspeakers 70*a,b*, 80*a,b* in the loudspeaker system 200 play substantially identical audio signals.

Some disclosed audio systems 300 can operatively couple (e.g., through a wireless coupling, or "link") a pair of loudspeaker systems 200, 200' to each other. In a first configuration, each of the plurality of loudspeaker systems 200, 200' can simultaneously reproduce an entirety of an audio signal. The audio signal can be a stereo signal 62, and each loudspeaker system 200, 200' can reproduce the stereo signal 62 in a stereo mode or in a mono mode, as just described. In context of a stereo (i.e., a two-channel) signal 62 playing through an audio system 300 configured according to the first configuration, each loudspeaker 70*a*, 70*b*, 70*a'*, 70*b'* operatively coupled to a left channel 72, 72' in each loudspeaker system 200, 200' can reproduce a left-channel portion of the stereo signal 62. Similarly, each loudspeaker 80*a*, 80*b*, 80*a'*, 80*b'* operatively coupled to a right channel 82, 82' in each loudspeaker system 200, 200' can reproduce a right-channel portion of the stereo signal 62.

In a second configuration, each of the plurality of loudspeaker systems 200, 200' can reproduce a corresponding portion of an audio signal synchronously with each of the other loudspeaker systems 200, 200'. In context of a stereo signal 62 playing through an audio system 300 configured according to the second configuration, each loudspeaker 70*a*, 70*b*, 80*a*, 80*b* in a first loudspeaker system 200 can reproduce the left-channel portion of the stereo signal 62 and each loudspeaker 70*a'*, 70*b'*, 80*a'*, 80*b'* in a second loudspeaker system 200' can reproduce the right-channel portion of the stereo signal 62 synchronously with the first loudspeaker system 200, regardless of whether each respective loudspeaker 70*a*, 70*b*, 80*a*, 80*b*, 70*a'*, 70*b'*, 80*a'*, 80*b'* in either loudspeaker system 200, 200' is operatively coupled to a left-channel 72, 72' or a right-channel 82, 82' of an amplifier 94, 94'. For example, one of the loudspeaker systems 200, 200' can reproduce only the left-channel signal and the other of the loudspeaker systems 200, 200' can reproduce only the right-channel signal.

Playback of Multi-Channel Signals

The foregoing discussion of two-channel audio signals playing through a pair of two-channel amplifiers is provided as but one of many audio systems, for conciseness. In general, an audio system 300 can include a plurality of loudspeaker systems, each having a corresponding one or more amplifiers, respectively having one or more channels coupled to a corresponding one or more loudspeakers. Each of the loudspeaker systems can be operatively coupled to each other in any of a selected plurality of configurations to reproduce a selected multi-channel media signal in any of a variety of ways (e.g., in mono, in stereo, in a 2.1 theater mode, in a 5.1 theater mode, in a 7.1 theater mode, in a 9.1 theater mode, or in a mode having a plurality of zones, with each zone being configured to reproduce the media signal in any of a variety of corresponding modes, e.g., mono, stereo, and so on).

Although reproduction of a two-channel input signal is briefly described above, benefits can accrue from a plurality of loudspeakers configured to play audio from each of any plurality of channels (e.g., two, three or more channels). In a general sense, a loudspeaker system configured to play two or more discrete audio signals is sometimes referred to in the art, and herein, as a "multi-channel" loudspeaker system. Similarly, a signal including information for each of a plurality of channels is sometimes referred to in the art, and herein, as a "multi-channel signal."

Figure 2:
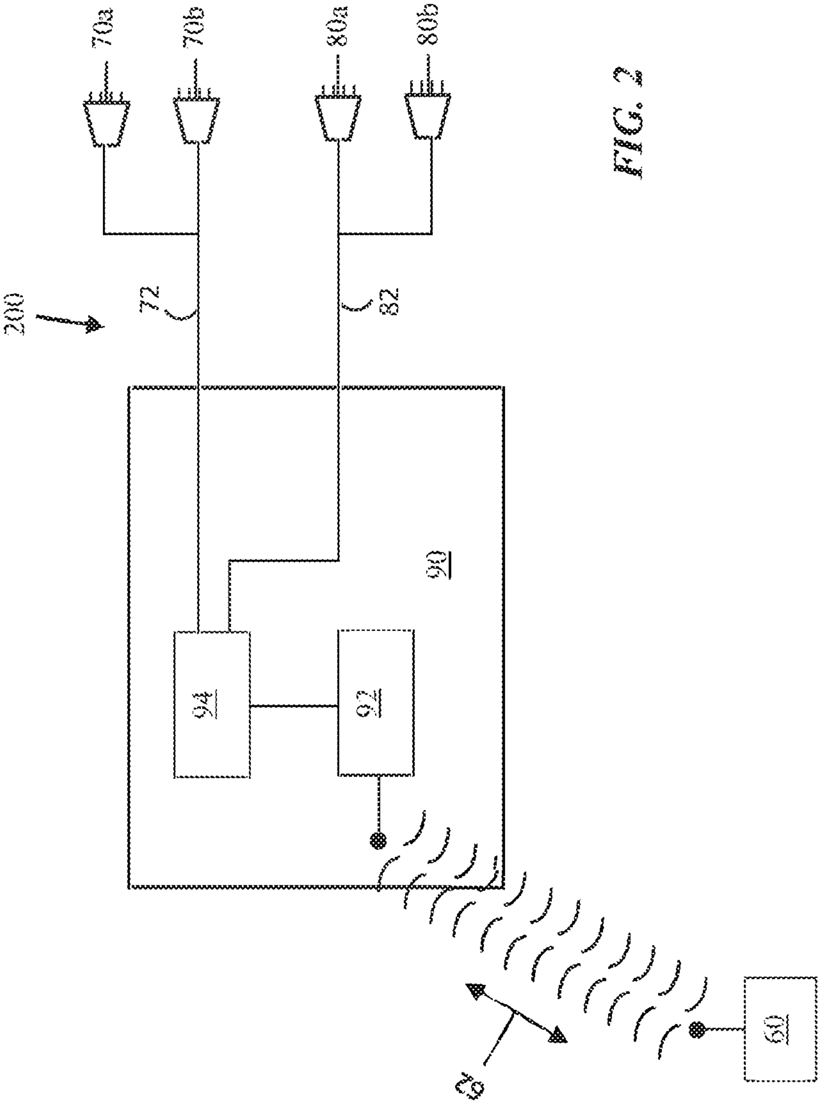
FIG. 2 schematically illustrates a media player in wireless communication with a particular example of a loudspeaker system of the type shown in FIG. 1. In particular, the loudspeaker system shown in FIG. 2 has a left audio channel and a right audio channel, and two loudspeakers operatively coupled to each of the audio channels.

In certain configurations, a multi-channel loudspeaker system (e.g., a system 100 shown in FIG. 1, a system 200 shown in FIG. 2) can reproduce an entirety of a multi-channel signal (e.g., signal 62) through all channels simultaneously, such that each loudspeaker in the loudspeaker system reproduces a substantially identical signal. As described above, in context of a stereo signal 62 having a left channel component and a right channel component, operating a given multi-channel loudspeaker system 200 in a "mono" mode can play the left channel component and the right channel component simultaneously through both channels 72, 82 of the loudspeaker system. In such an instance, the loudspeaker system 200 can emit a relatively higher level of sound power (e.g., since, in the case of a two-channel signal, both loudspeaker channels emit the same signal). However, one or more of the benefits of channel separation (e.g., perception of various sources of sound) can be lost when a plurality of loudspeaker channels substantially simultaneously reproduce the entirety of the multi-channel input signal.

In other configurations, a multi-channel loudspeaker system can reproduce each respective channel of a multi-channel signal through a corresponding loudspeaker channel. For example, a multi-channel signal can include a signal component corresponding to each of a center channel, a left channel, and a right channel. Other multi-channel signals can include a signal component corresponding to a left, front channel, a right, front channel, a left, rear channel, a right, rear channel, and a center, front channel. In instances, a multi-channel loudspeaker system can provide one or more benefits arising from channel separation, though the overall sound power emitted by the loudspeaker system can be less than if all (e.g., all five) channels simultaneously emitted substantially identical signals.

Figure 3:
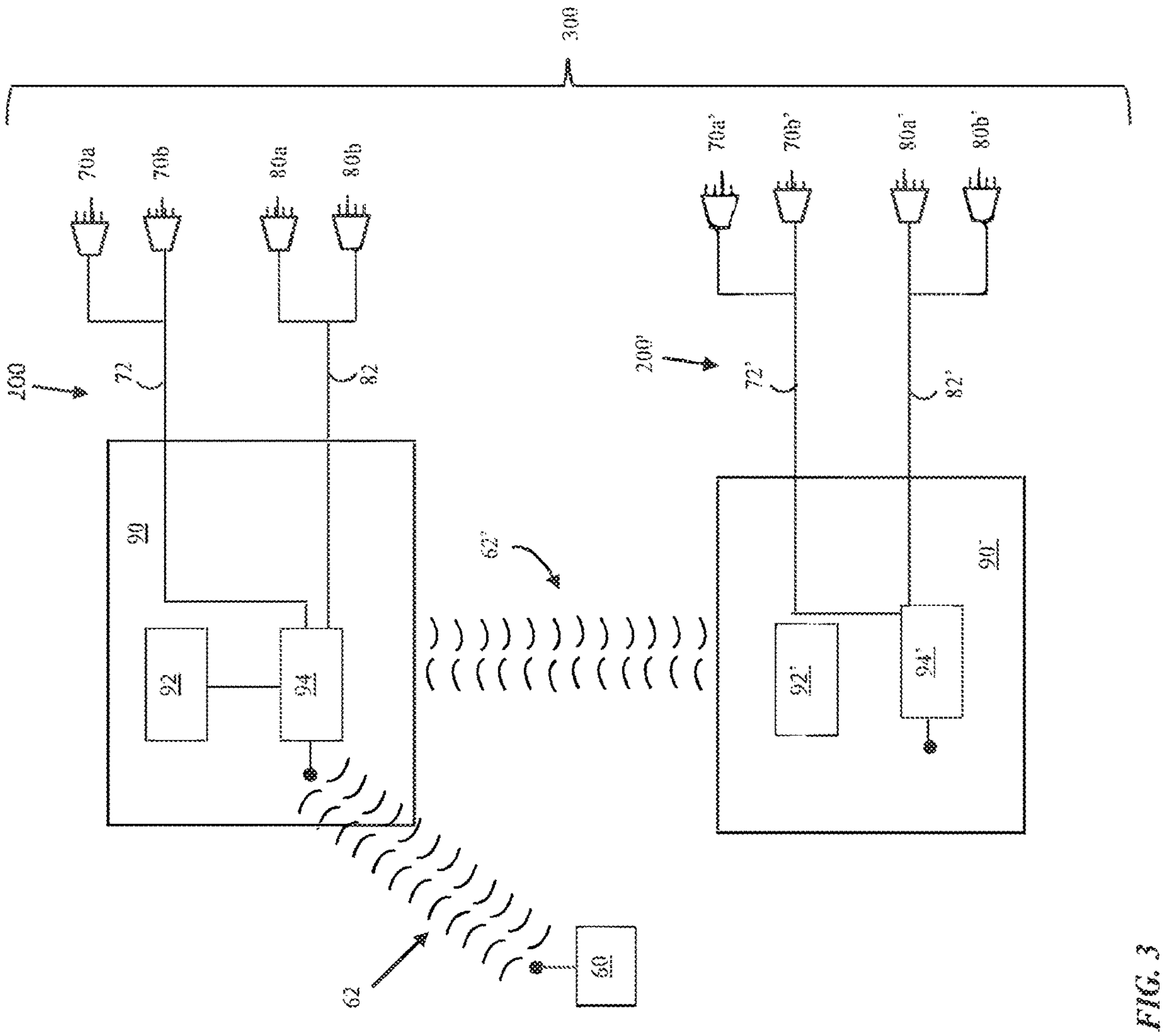
FIG. 3 schematically illustrates a media player in wireless communication with two loudspeaker systems of the type shown in FIG. 2.

As shown by way of example in FIG. 3, some disclosed wireless audio systems 300 can operatively couple a plurality of wireless loudspeaker systems 200, 200' to each other and to a selected one or more media sources 60. Each loudspeaker system 200, 200', in turn, can have a plurality of loudspeakers arranged in a selected multi-channel configuration.

Generalized Loudspeaker System Configurations

Figure 4:
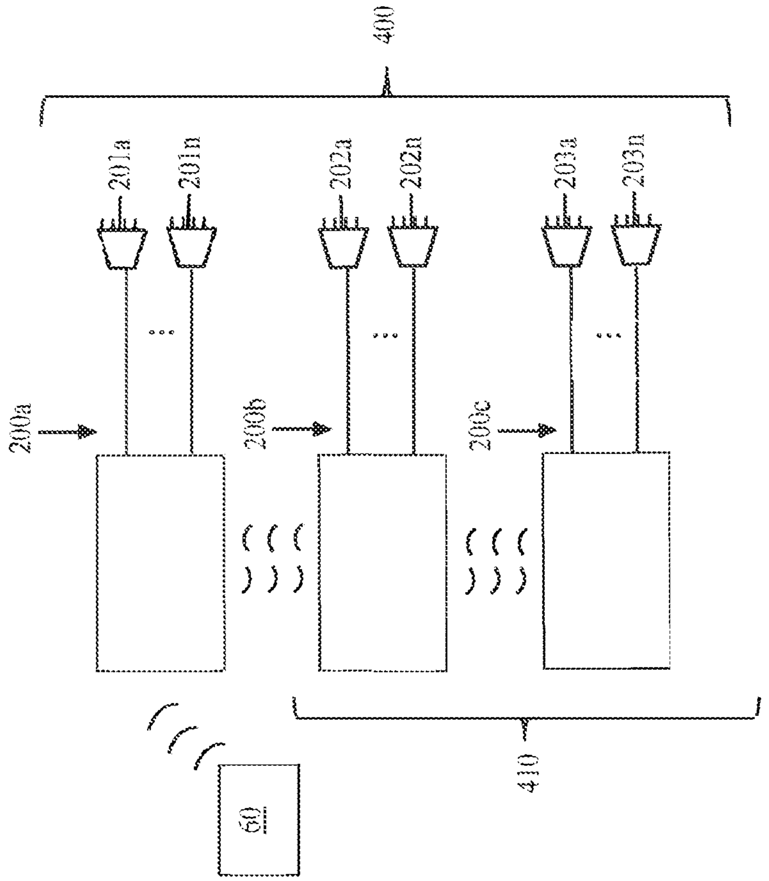
FIG. 4 schematically illustrates a media player in wireless communication with a plurality of loudspeaker systems of the type shown in FIG. 1.

FIG. 4 shows a generalized audio system 400. The system 400 has a plurality of loudspeaker systems 200*a*-200*n* and at least one media source 60. (Other audio systems can include a plurality of media sources, or a given media source can emit a plurality of media signals, e.g., one media signal for each respective zone having a corresponding one or more loudspeaker systems. FIG. 4 shows a single zone.)

In a first configuration mode, each wireless loudspeaker system in a selected plurality of wireless loudspeaker systems corresponding to a given zone can reproduce an entirety of a multi-channel audio signal corresponding to the zone. For example, each wireless loudspeaker system in the plurality of wireless loudspeaker systems can operate in a multi-channel mode in which each respective loudspeaker channel reproduces a corresponding channel of a multi-channel audio signal. Such a configuration is sometimes referred to as an "amplify" mode because the entirety of the multi-channel signal is reproduced by a plurality of loudspeaker systems, despite that each respective channel of each loudspeaker system might reproduce but one of a plurality of channels within the multi-channel signal.

In a second configuration mode, each wireless loudspeaker system in a plurality of wireless loudspeaker systems can reproduce a respective one channel of a multi-channel audio signal. For example, a first wireless loudspeaker system can be configured to reproduce a left-channel signal in a stereo signal, and a second wireless loudspeaker system can be configured to reproduce a right-channel signal in the stereo signal. The first wireless loudspeaker system and the second wireless loudspeaker system can be configured to reproduce the left-channel signal and the right-channel signal, respectively, synchronously with each other.

Figure 5:
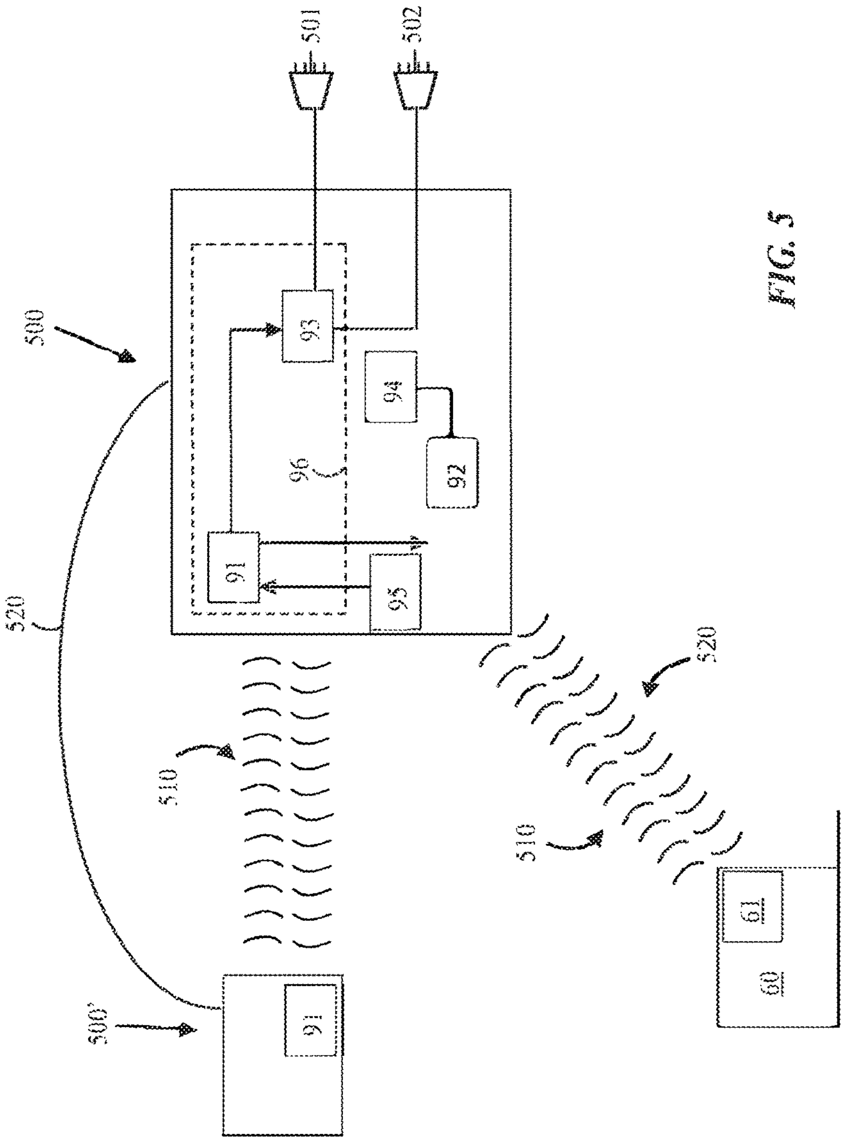
FIG. 5 schematically illustrates a media player in wireless communication with a first embodiment and a second embodiment of a loudspeaker system of the type shown in FIG. 1.

Referring now to FIG. 5 by way of example, some particular loudspeaker systems 500 have at least a first loudspeaker 501 and a second loudspeaker 502. The first and the second loudspeakers 501, 502 can be selectively operable in a single-channel mode or in a multi-channel mode. In the single-channel mode, the first and the second loudspeakers 501, 502 are operatively coupled to each other such that each loudspeaker can simultaneously reproduce a substantially identical signal. In the multi-channel mode, the first and the second loudspeakers 501, 502 are operatively coupled to each other such that the first loudspeaker 501 can reproduce a first-channel signal (e.g., a left-channel signal) and the second loudspeaker 502 can reproduce a second-channel signal (e.g., a right-channel signal).

In a general sense, the first-channel signal and the second-channel signal can constitute respective portions of a multi-channel signal. For example, such a multi-channel signal can, in general, include a plurality of signals corresponding to a corresponding plurality of zones. Each respective signal, in turn, can include a respective plurality of signal portions representing a given channel.

A loudspeaker system 500 can include a mode selector 93 configured to select one of a single-channel mode and a multi-channel mode. In context of a system including a plurality of zones, the mode selector 93 can be configured to select one of a single-zone mode and a multi-zone mode, as well as, within each zone, a single-channel mode and a multi-channel mode. As but one example described more fully below, the mode selector 93 can select between or among a plurality of channel modes in response to a detected proximity of another loudspeaker system 500'. For example, a mode selector 93 can configure a given loudspeaker system 500 to operate in a multi-channel mode in response to a first detected proximity of another loudspeaker system 500'. The mode selector 93 can configure the given loudspeaker system to operate in a single-channel mode in response to a second detected proximity of the other loudspeaker system 500' within a predetermined duration following the first detected proximity of the other loudspeaker system. Of course, some mode selector embodiments can configure the loudspeaker system 500 to operate in a single-channel mode in response to the first detected proximity of another loudspeaker system 500', and configure the loudspeaker system 500 to operate in the multi-channel mode in response to a second detected proximity within a predetermined duration after the first detected proximity. In some instances, each of the plurality of loudspeaker systems 500, 500' (and/or others, not shown) can be substantially simultaneously configured by respective mode selectors 93, 93' upon mutual detection of a proximity of each other.

A loudspeaker system 200, 300, 500 can include a transceiver, such as, for example, a wireless transceiver 92, configured to receive and/or to transmit a wireless signal containing media information. The media information can include a single- or a multi-channel audio signal 62. Media information can also include any of a variety of forms of video signals, or composite video and audio signals.

The transceiver can be configured to pair with a wireless media player 60 in response to a detected proximity of a wireless media player when the transceiver 92 is not already paired with a media player. In some embodiments, the mode selector 93 is also configured to select the multi-channel mode when the transceiver 92 is initially paired with a wireless media player 60. In such an instance, the mode selector 93 can be configured to select the single-channel mode in response to a proximity of another loudspeaker system 500' being twice detected within a predetermined duration.

In some embodiments, when paired with a wireless media player 60, the transceiver 92 can also be configured to pair with another loudspeaker system 500' in response to a detected proximity of the loudspeaker system 500'. When paired with each other, each loudspeaker system 500, 500' can reproduce or otherwise process a media signal 62 from a media player 60. As but one example, two paired loudspeaker systems 500, 500' can each simultaneously reproduce a multi-channel signal 62 in a multi-channel mode (sometimes referred to as an "amplify" mode). As another example, two paired loudspeaker systems 500, 500' can each simultaneously reproduce a respective one or more channels of a multi-channel signal. In context of a two-channel signal, one of the paired loudspeaker systems 500, 500' can reproduce the left-channel signal and the other of the paired loudspeaker systems can reproduce the right-channel signal, thereby providing a measure of "stereo" playback, as described above.

Configuration by User Gesture

Some disclosed audio systems 500, 500' can be configured according to one or more operating (or configuration) modes using, for example, simple user gestures.

As but one example, a user can position a first loudspeaker system 500 in close proximity (i.e., less than several centimeters (cm), such as less than about 3 cm to about 4 cm, for example, between about 2 cm and about 3 cm apart) to a wireless media player 60 or to another, e.g., a second, loudspeaker system 500'. The first loudspeaker system 500 can have a transceiver module 91 configured to detect a presence of a peer transceiver module associated with, for example, the wireless media player 60 and/or the other loudspeaker system 500'. For example, the transceiver module 91 can be configured to detect a presence of a peer transceiver module (e.g., module 91' in the second loudspeaker system 500') when the transceiver modules are spaced apart by no more than about 4 cm.

The respective transceiver modules 91, 91' can transmit and receive wireless communication signals to and from each other. Some such communication signals 510 can contain configuration information associated with the first loudspeaker system 500, the second loudspeaker system 500', and/or the media player 60.

Each loudspeaker system (and/or the media player 60), can include a link activator 95, 95' configured to establish a peer-to-peer wireless communication link 510, 510' between the transceiver module 91 and the peer transceiver module 91'. The peer-to-peer communication link 510, 510' can be suitable for the transceiver modules 91, 91' to mutually exchange wireless communication signals containing configuration information associated with the corresponding devices (e.g., the first loudspeaker system 500, the media player 60, and/or the second loudspeaker system 500').

In some instances, the peer-to-peer communication link 510, 510' can be a first peer-to-peer communication link, and the first loudspeaker system 500, the media player 60, and/or the second loudspeaker system 500', can accommodate a second peer-to-peer wireless link 520. The configuration information exchanged over the first communication link 510, 510' can be used to configure the second peer-to-peer wireless link 520 and associated transceivers (e.g., transceivers 92, 92'). The second peer-to-peer wireless link 520, 520' can be used to carry (or exchange), for example, media information from a media player 60 to the first loudspeaker system 500 and/or from the first loudspeaker system to the second loudspeaker system 500'.

A configuration module 96 can select one of a single-channel mode and a multi-channel mode for the first loudspeaker system 500. The selected configuration can be, but need not be, based in part on configuration information contained in a wireless communication signal 510 received from the peer transceiver module (e.g., module 61). For example, the configuration module 96 can simply determine whether a peer transceiver 61 has paired with the transceiver 91 in the first loudspeaker system 500 and whether the peer transceiver 61 has been placed in close proximity to the first loudspeaker system 500 one or more times within a selected duration. From such proximity information, the configuration module 96 can select, for example, a single-channel or a multi-channel configuration for the first loudspeaker system.

With such a configuration, a loudspeaker system 500 can be placed in close proximity to a peer device (e.g., a wireless media player 60 or another loudspeaker system 500'). Upon being placed in close proximity to each other, the loudspeaker system 500 and the peer device 60, 500' can link together wirelessly in a suitable manner as to play a media signal 520 through the loudspeaker system in a selected mode.

As an example, a second loudspeaker system 500' can be placed in close proximity to the first loudspeaker system 500, and the first and the second loudspeaker systems 500, 500' can be wirelessly paired with each other (e.g., linked with each other). For example, placing the loudspeaker systems 500, 500' in close proximity to each other can initiate pairing of the first loudspeaker system 500 and the second loudspeaker system 500'. Once paired with each other, the first and the second loudspeaker systems can simultaneously play at least a portion of a media signal 520, 520' (e.g., each can be in a single-channel or a multi-channel mode). As a default setting, each of the first and the second loudspeaker systems can be configured to operate in a multi-channel mode upon pairing with each other, and, in the event of being brought into close proximity to each other a second time within a predetermined duration, to operate in complementary single-channel modes (e.g., system 500 playing a left-channel signal and system 500' playing a right-channel signal).

Figure 6:
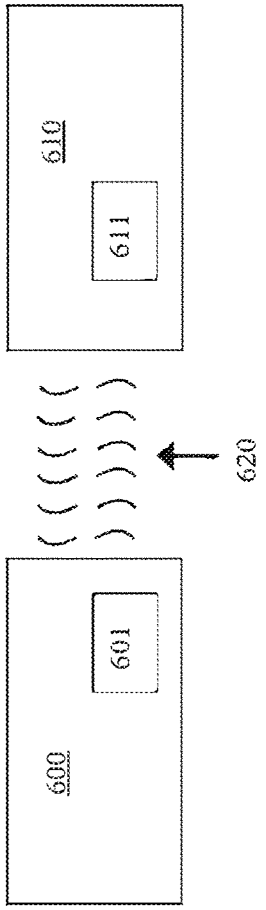
FIG. 6 schematically illustrates a first device having a powered transceiver in wireless communication with a second device having an unpowered communication device, or tag.

Although systems including powered transceivers placed into close proximity are described above, some contemplated embodiments described above include a device 600 (e.g., a media device and/or a loudspeaker system) having a powered transceiver 601 placed into close proximity to a device 610 having an unpowered communication device 611, sometimes referred to in the art as a "tag". As illustrated in FIG. 6, a common example of a tag 611 is an RFID device. Such a tag 611 can store information (e.g., configuration information) and can transmit such information when a powered device, e.g., a first transceiver 601, is in close proximity to the tag 611. A tag is but one contemplated example of a wireless transceiver for a peer-to-peer wireless connection over close proximity.

Disclosed systems for and approaches of automatically configuring wireless systems provide substantial simplification of pairing devices, yet provide substantially similar, if not identical, degrees of confidence in security and pairing robustness. Disclosed systems and approaches can be used in connection with contactless transactions, data exchange, and simplified setup of more complex communications systems.

Wireless Protocols

Existing wireless communication protocols between or among computing environments require substantial interactions from a user to configure them. In contrast, presently disclosed wireless communication protocols can be suitable for automatically configuring wireless systems, including wireless audio systems, as described above. Some disclosed embodiments of such wireless communication protocols require relatively little user interaction to achieve any of a plurality of wireless system configurations. For example, as noted above, one or more of a variety of wireless audio system configurations can be selected using user gestures (e.g., by bringing a pair of loudspeaker systems into close proximity to each other one or more times during a predetermined duration). Some disclosed wireless loudspeaker systems incorporate one or more communications transceivers configured to operate with such a wireless communication protocol.

Near Field Communication (NFC) is a set of short-range wireless connectivity technologies that can transmit relatively small amounts of information with little initial setup time and power consumption. NFC enables relatively simple and relatively secure two-way (point-to-point) interactions between electronic devices when brought into close proximity with each other. Disclosed applications for NFC include contactless transactions, data exchange and simplified setup of more complex technologies such as WLAN.

NFC communications are based on inductive coupling between two loop antennas and operates in the globally available and unlicensed ISM band of 13.56 MHz. NFC supports data rates of 106 kbit/s, 212 kbit/s and 424 kbit/s. NFC communications protocols and data exchange formats are generally based on existing RFID standards as outlined in ISO/IEC 18092:

NFC-A based on ISO/IEC 14443A

NFC-B based on ISO/IEC 14443B

NFC-F based on FeliCa JIS X6319-4

This makes NFC devices compatible with existing passive 13.56 MHz RFID tags and contactless smart cards in line with the ISO 18000-3 air interface.

Figure 7:
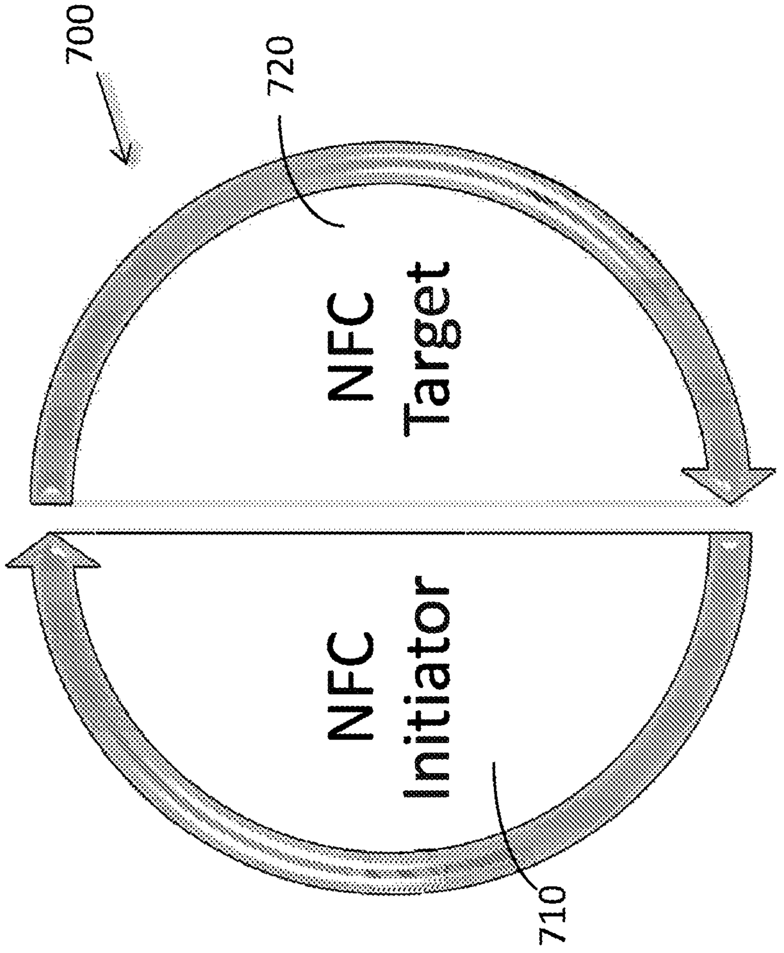
FIG. 7 schematically illustrates a point-to-point communication protocol for an active transceiver.

NFC point-to-point communications typically include an initiator and a target, as shown in FIG. 7. For active communications between two powered NFC devices (e.g., transducers 61, 91 in FIG. 5), the initiator and the target can alternately generate their own fields as indicated in FIG. 7. In passive communications mode, a passive target, such as a tag 611 (FIG. 6), draws its operating power from the RF field actively provided by the initiator, for example an NFC reader. In this mode an NFC target can take very simple form factors, such as a sticker, because no battery is required.

NFC-enabled devices generally support any of three operating modes:

- Reader/writer: Compliant with the ISO 14443 and FeliCa specifications, the NFC device is capable of reading a tag (an unpowered NFC chip) integrated, for example, in a smart poster, sticker or key fob.
- Peer-to-peer: Based on the ISO/IEC 18092 specification, two self-powered NFC devices can exchange data such as virtual business cards or digital photos, or share WLAN link setup parameters.
- Card emulation: Stored data can be read by an NFC reader, enabling contactless payments and ticketing within the existing infrastructure.

As but specific examples of such wireless protocols, an implementation of the NFC (near-field-communications) standard can be used to configure one or more Bluetooth-enabled devices (e.g., transceivers 92 in FIG. 5, and a corresponding transceiver in the media device 60). Other wireless devices can be configured, as well. For example, IEEE 802.11 devices (sometimes referred to as "Wi-Fi" devices) can be complementarily configured, including with passwords and security codes or phrases, to pair with each other and/or other network devices using user gestures as described herein.

One particular example of a disclosed wireless system includes an NFC peer-to-peer (p2p) chip, a processor, memory, an out of band radio circuit (including but not limited to Bluetooth), and interrupt hardware. A task scheduler, an interrupt service routine, interprocess messaging system, and an NFC data encapsulation parser can be executed in the microprocessor. Alternatives to detecting proximity of another device include received signal strength indication (RSSI) in connection with a Bluetooth, a Bluetooth Low Energy, or a Wi-Fi transmitter.

A loudspeaker system of the type disclosed herein can include a transceiver (e.g., transceivers 61 or 91 in FIG. 5) that acts as an initiator and/or a target. When acting as an initiator 710, the transceiver 700 can send a SENSF_REQ command to the handset or other peer device (e.g., another loudspeaker system 500' (FIG. 5)). The data and payload format contained in the NFC Forum Digital Protocol Technical Specification (dated Nov. 17, 2010) (e.g., Section 6.4, p. 74; FIG. 23) can be followed.

Figure 8:
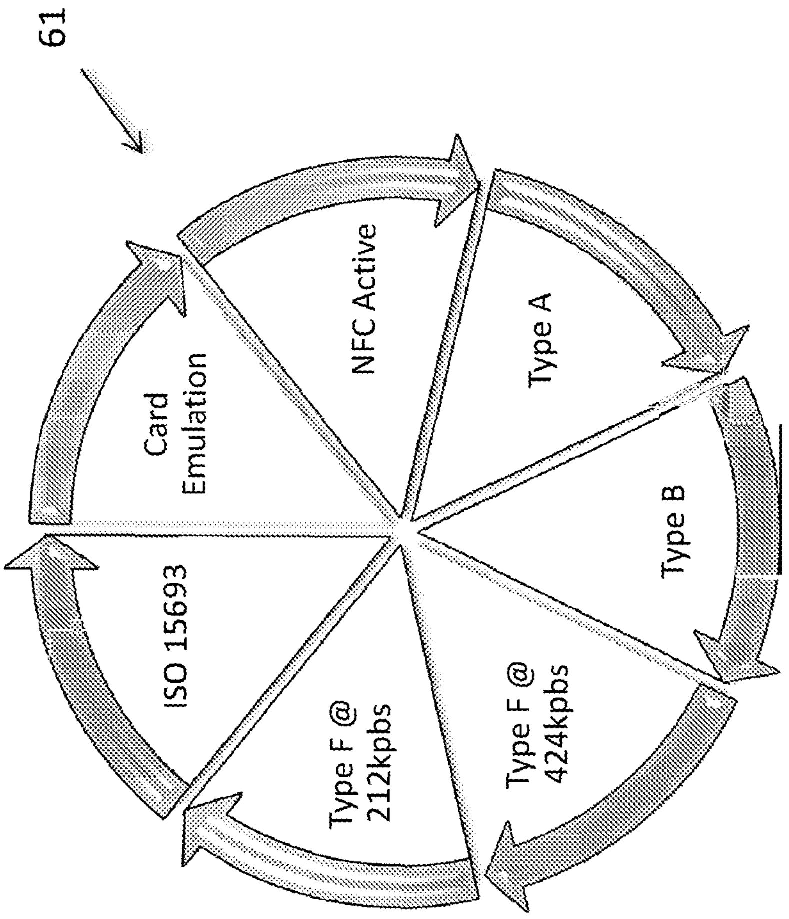
FIG. 8 schematically illustrates a round-robin cycle of polling among a plurality of selected wireless communication protocols.

A typical interaction between an NFC-enabled loudspeaker system 500, 500' and another NFC-enabled device (e.g., media player 60) will be described as but one possible example of disclosed systems. A typical NFC-enabled device, such as, for example, an Android phone or other media player 60, can poll through a plurality of protocols in a "round robin" cycle, as indicated in FIG. 8. For example, the device 61 can poll sequentially through the protocols: ISO 15693, Card Emulation, NFC Active, etc.

Some disclosed wireless systems, e.g., some disclosed loudspeaker systems, include a commercially available NFC device configured to poll between NFC Initiator Mode (at 424 kpbs) for a first duration (e.g., about 100 milliseconds (ms)) and NFC Target Mode (at 424 kpbs) for a second duration (e.g., about 400 ms), as shown in FIG. 7. One example of such an NFC device is a TRF7970A NFC device commercially available from Texas Instruments. FIG. 7 shows an example of such polling.

Figure 9:
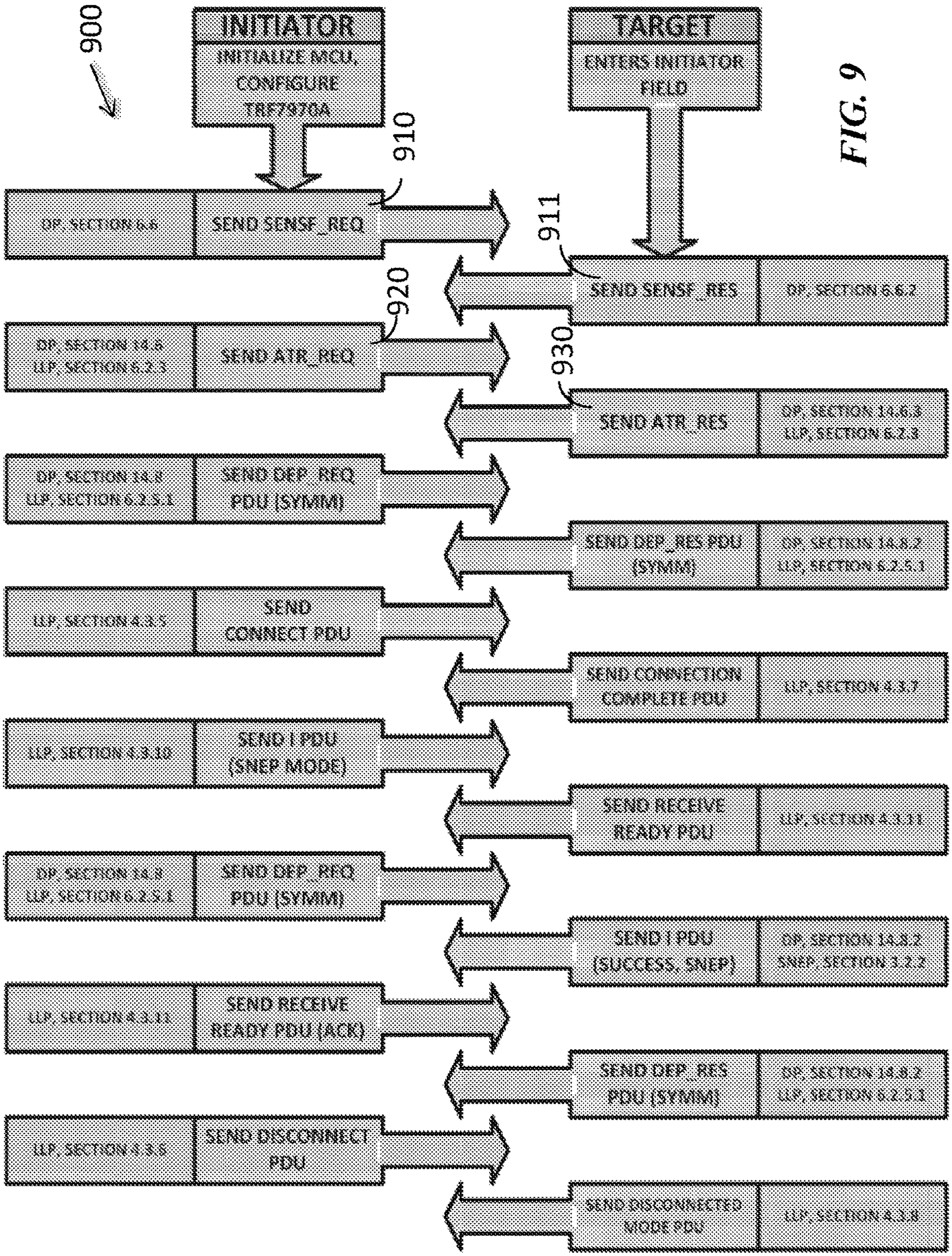
FIG. 9 schematically illustrates a wireless, peer-to-peer communication protocol between an initiator device and a target device.

Referring now to FIG. 9, an example of peer-to-peer operation using the Simple NDEF Exchange Protocol (SNEP) will be described. The example SNEP operation 900 described herein includes the NFC-F protocol, NFC-DEP, SNEP, NDEF Message Format, and a Logical Disconnection Process as but one example.

The operational overview depicted in FIG. 9 is based on a commercially available TRF7970A device interacting with another NFC-enabled peer-to-peer device, such as an NFC-enabled Android operating system handset. The TRF7970A can be placed in active initiator mode 710 at 424 kbps (FIG. 7).

The SENSx_REQ (first command) 910 can determine the protocol to be followed (e.g., NFC-F or NFC-A). For purposes of illustration, communication using the NFC-F standard will be discussed. However, other protocols and devices are contemplated, as will be understood by those of ordinary skill in the art after reviewing the entirety of this disclosure.

For convenience, relevant NFC Forum Specifications are listed beside each command in FIG. 9. As used herein, the term "DP" refers to the NFC-Forum Technical Specification Digital Protocol 1.0; the term "LLP" refers to the NFC-Forum Technical Specification Logical Link Protocol; and the term "SNEP" refers to the NFC-Forum Technical Specification SNEP 1.0

Once a connection (e.g., wireless link 510) between the wireless devices 61, 91 (FIG. 5) is established, data can flow in either direction. FIGS. 5 and 9 are simplified illustrations of the flow of information; SYMM PDUs can, and for the most part are, exchanged multiple times in between the respective illustrated commands.

Memory can be allocated in the initiator and in the target as follows:

| Flash | |
|---|---|
| main.c | 200 bytes |
| mcu.c (timer) | 300 bytes |
| spi.c | 500 bytes |
| trf797x.c | 1500 bytes |
| snep.c | 1000 bytes |
| llcp.c | 2000 bytes |
| nfc_dep.c | 1000 bytes |
| Nfc_f.c | 500 bytes |
| nfc_p2p.c | 1000 bytes |
| Estimated Total FLASH: 10 kB | |

| RAM | |
|---|---|
| main.c | 70 bytes |
| mcu.c (timer) | 10 bytes |
| spi.c | 01 byte |
| trf797x.c | 144 bytes |
| snep.c | 20 bytes |
| llcp.c | 16 bytes |
| nfc_dep.c | 18 bytes |
| nfc_f.c | 12 bytes |
| Nfc_p2p.c | 12 bytes |
| stack | 70 bytes |
| Estimated RAM: 373 with stack and 303 w/o stack | |

Figure 10:
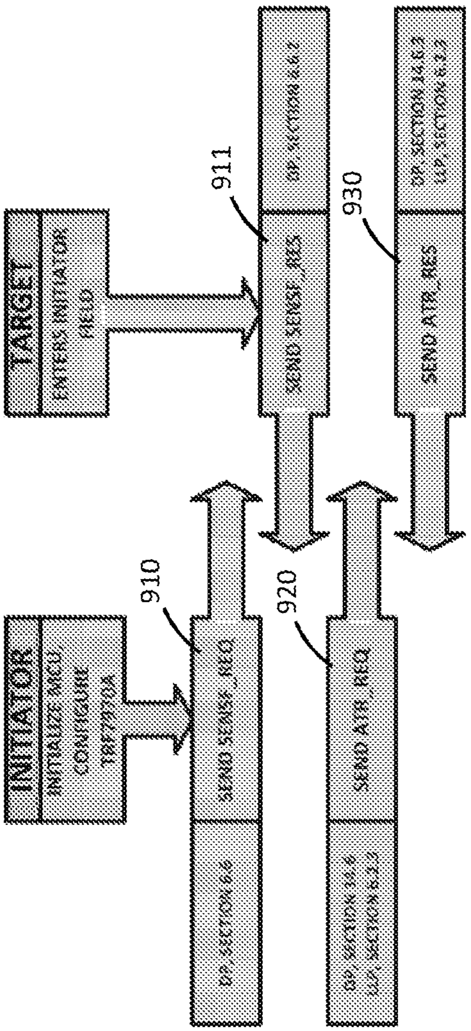
FIG. 10 shows a portion of the communication protocol shown in FIG. 9.

FIG. 10 shows a simplified schematic illustration of an exchange of data, or other information, between an initiator and a target when establishing an initial pairing between transceivers brought into close proximity to each other. The initiator can send a SENSF_REQ and the target responds with a SENSF_RES 911.

Figure 11:
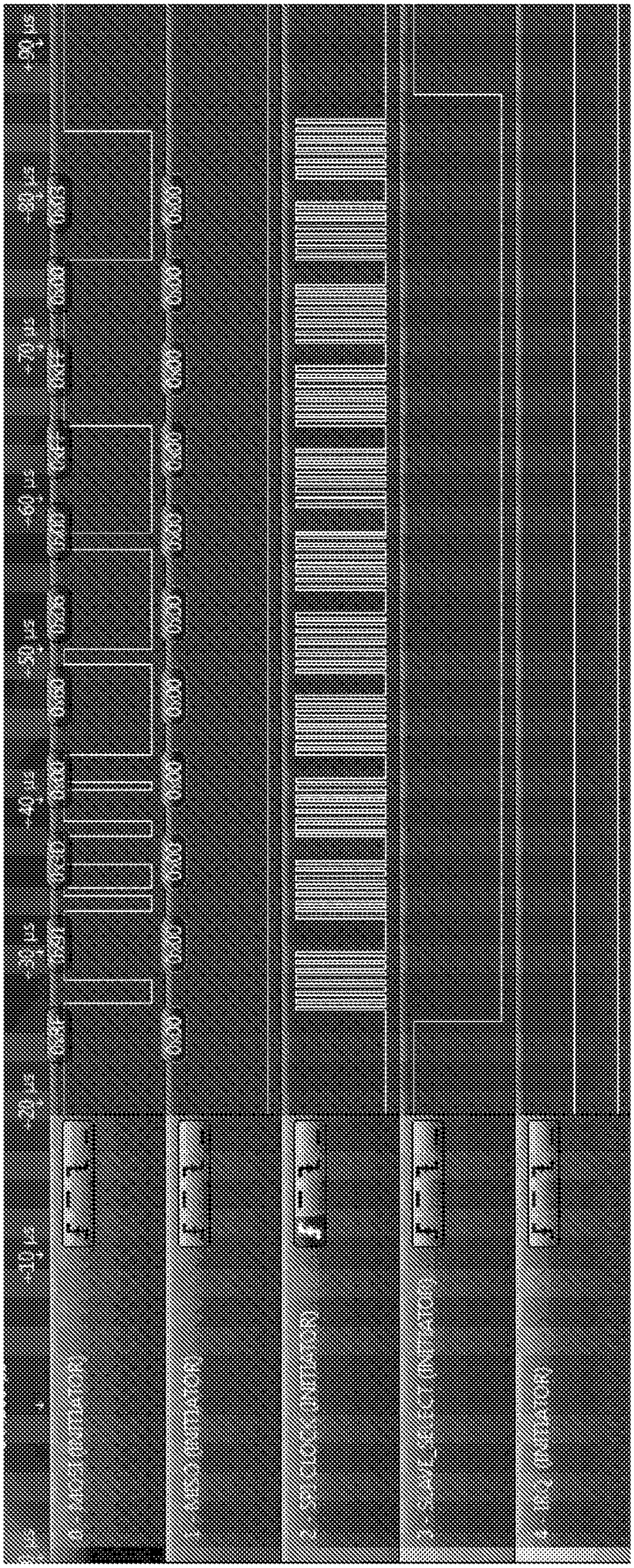
FIG. 11 shows an example of signals according to the protocol shown in FIGS. 9 and 10.

FIG. 11 shows an example of a SENSF_REQ. SENS_F can be transmitted, then EOTX IRQ can be received and handled. First in, first out (FIFO) can be cleared, etc. (similar to other commands transmitted with the TRF7970A.)

The following table describes the word allocation of the SENSF_REQ 910 (shown in FIG. 11).

| Byte # | Description | Value (hex) |
|---|---|---|
| 0 | Length | 06 |
| 1 | Command | 00 (DP, SENSF_REQ) |
| 2:3 | System Code (SC) | FF FF (DP, Section 6.6.1.1, default) |
| 4 | Request Code (RC) | 00 (DP, no system code information requested) |
| 5 | Time Slot Number (TSN) | 03 (DP, Table 42, 4 time slots) |

As used in the table above:

1 The term "SC" refers to System Code (SC) and contains information regarding the NFC Forum Device to be polled for (e.g., the Technology Subset). (see Requirements 80 table in DP for more information);

2. The term "RC" refers to the Request Code (RC) is used to retrieve additional information in the SENSF_RES Response and Table 41 (page 76 in DP) specifies the RC code(s); and 3. The term "TSN" refers to the Time Slot Number (TSN) is used for collision resolution and to reduce the probability of collisions.

An anticollision scheme can be based on a definition of time slots in which NFC Forum Devices in Listen Mode are invited to respond with minimum identification data. The NFC Forum Device in Poll Mode can send a SENSF_REQ Command with a TSN value indicating the number of time slots available. Each NFC Forum Device in Listen Mode can present within the range of the Operating Field, and then randomly select a time slot in which it responds. The TSN byte set to 00h can force all NFC Forum Devices in Listen Mode to respond in the first time slot, and therefore, this TSN value can be used if collision resolution is not used.

In response to the SENSF_REQ 910 command sent by the initiator, the target can respond with a SENSF_RES 911. The SENSF_RES word can be allocated as follows:

| Byte # | Description | Value (hex) |
|---|---|---|
| 0 | Length | 12 (or 14, see note below on RD) |
| 1 | Command | 01 (SENSF_RES) |
| 2:9 | NFCID2 | 01 FE 6F 5D 88 11 4A 0F (for example) |
| 10:11 | PAD0 | C0 C1 |
| 12:14 | PAD1 | C2 C3 C4 |
| 15 | MRTICHECK | C5 |
| 16 | MRTIUPDATE | C6 |
| 17 | PAD2 | C7 |
| 18:19 | Request Data (RD) | (only present when RC ≠ 00, sent in SENSF_REQ) |

EORX ITRQ can be received, and FIFO status register can be read for the SENSF_RES (response). In an example, the response can include 18 bytes: Register 0x1C=0x12=DEC 18. Then the FIFO can reset, similar to other TRF7970A RX operations.

Although NFCID2 is shown in the table above as an example, each device/session can have a corresponding unique number returned here. The NFC Forum Device can set PAD0 to a different value if configured for Type 3 Tag platform in a particular configuration. (The NFC specification says this value must otherwise be set to FF FF.) The PAD1 format can depend on the NFC-F Technology Subset for which the NFC Forum Device in Listen Mode is configured. NFC Forum Devices configured for the NFC-DEP Protocol do not generally use PAD1.

Coding of MRTICHECK can depend on the NFC-F Technology Subset for which the NFC Forum Device in Listen Mode is configured. NFC Forum Devices configured for the NFC-DEP Protocol do not generally use MRTICHECK.

The MRTIUPDATE format can depend on the NFC-F Technology Subset for which the NFC Forum Device in Listen Mode is configured. NFC Forum Devices configured for the NFC-DEP Protocol do not generally use MRTIUPDATE.

The PAD2 format can depend on the NFC-F Technology Subset for which the NFC Forum Device in Listen Mode is configured. NFC Forum Devices configured for the NFC-DEP Protocol do not generally use PAD2.

Request Data (RD) can be included in the SENSF_RES Response 911 if requested in the RC field of the SENSF_REQ Command 910. The Request Data (RD) format can depend on the NFC-F Technology Subset for which the NFC Forum Device in Listen Mode is configured.

Following the initialization and anti-collision procedure defined in [DIGITAL], the Initiator device can send the Attribute Request ATR_REQ command 920 (FIGS. 9, 12):

| Byte # | Description | Value (hex) |
|---|---|---|
| | | NFC-DEP portion |
| 0 | Length | 25 (37 bytes) |
| 1:2 | Command | D4 00 (ATR_REQ) |
| 3:12 | NFCID3I | NFCID3I = 01 FE 6F 5D 88 11 4A 0F 00 00 |
| 13 | DIDI | 00 |
| 14 | BSI | 00 |
| 15 | BRI | 00 |
| 16 | PPI | 32 (max payload 254 bytes) |
| | | LLCP portion |
| 17:19 | LLCP Magic # | 46 66 6D |
| 20:22 | TLV: Version # | 01 01 11 (v1.1) |
| 23:26 | TLV: MIUX | 02 02 07 80 (128 + MIU (1792) = 1920 bytes) |
| 27:30 | TLV: Services | 03 02 00 03 (WKS LLC Link Management) |
| 31:33 | TLV: LTO | 04 01 32 (500 mSec timeout, FIG. 22, LLP) |
| 34:36 | TLV: Option Param | 07 01 03 (Class 3) (Table 7, LLP) |
| 37:48 | TLV: Private | Tap To Pair Data |

Figure 12:
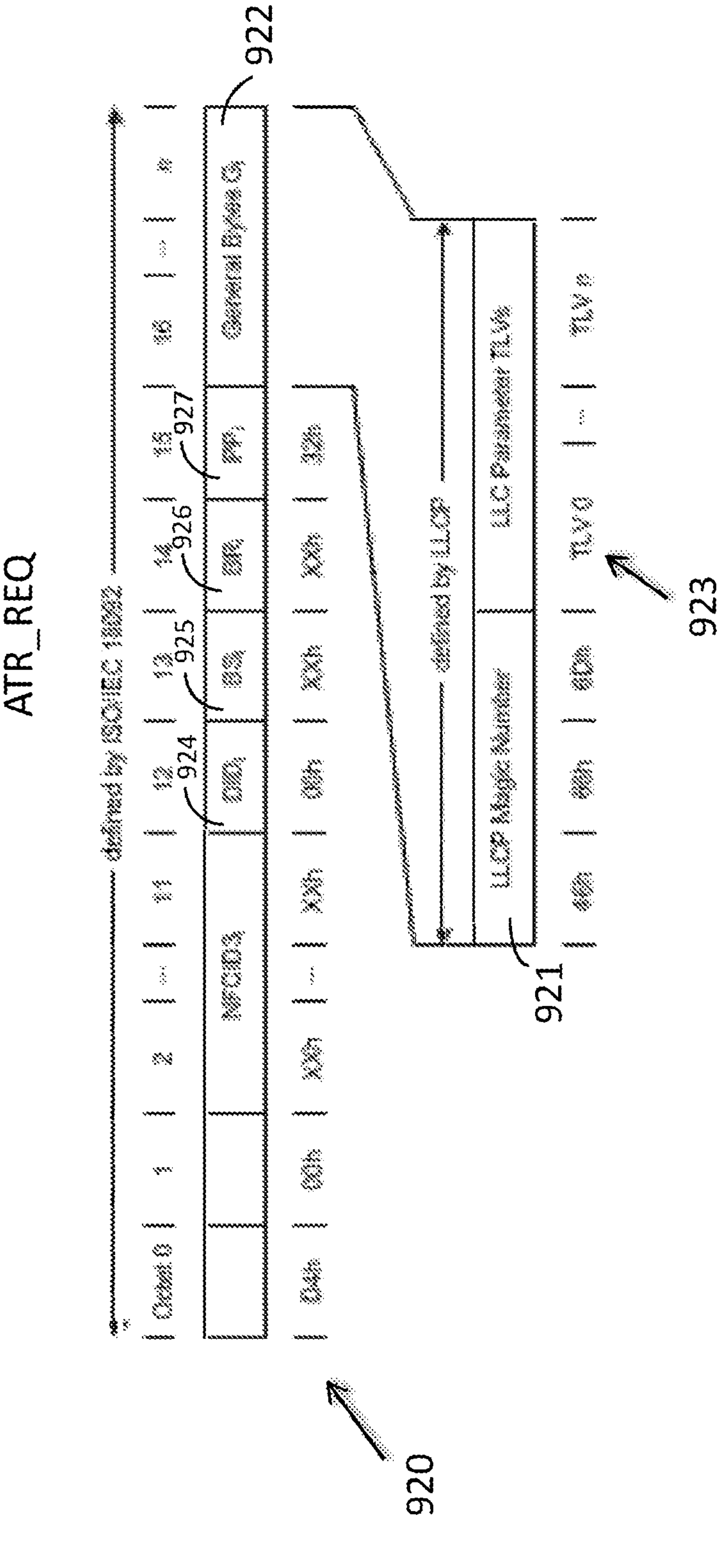
FIG. 12 shows an example of word allocation of an attribute request command according to the protocol shown in FIGS. 9 and 10.

The format of the ATR_REQ 920 is shown in FIG. 28 of the LLP Specification and FIG. 12 herein, and summarized in the table above. The Initiator can include the NFC Forum LLCP magic number 921 in the first three octets of the ATR_REQ General Bytes field 922. All LLC parameters defined in Section 4.5 Table 6 for use in PAX PDUs that are to be exchanged can be included as TLVs beginning at the fourth octet 923 of the ATR_REQ General Bytes field 922.

The PAX PDU exchange described in the LLC link activation procedure (cf. Section 5.2) need not be used. The ATR_REQ General Bytes field need not contain any additional information.

NFCID3I is the NFC Forum Device identifier of the Initiator for the NFC-DEP Protocol.

The Initiator Device Identification Number (DIDI) 924 can be used to identify different Targets (e.g., different loudspeaker systems 500, 500') that are activated at one time. If multiple target activation is not used, the DIDI field can be set to zero.

BSI 925 and BRI 926 indicate the bit rates in Active Communication mode supported by the Initiator in both transmission directions. The coding of BSI and BRI is specified in Table 88 and Table 89 of the Digital Protocol Specification.

The PPI field 927 indicates the Length Reduction field (LRI) and the presence of optional parameters. The format of the PPI byte is specified in Table 90 of the Digital Protocol Specification.

The NFC-DEP MAC component can use the three octet sequence "46h 66h 6Dh" as the NFC Forum LLCP magic number. This magic number is encoded into the ATR_REQ 920/ATR_RES 930 General Bytes fields, as described below. The use of the magic number by the Initiator and Target can indicate compatibility with the requirements of this specification. The link activation phase can be started when a peer device capable of executing the LLCP peer-to-peer protocol enters communication range (e.g., is positioned in close proximity), and the local device is instructed to perform peer-to-peer communication. The link activation phase can be different for the Initiator and the Target device and is described separately for each role.

Figure 13:
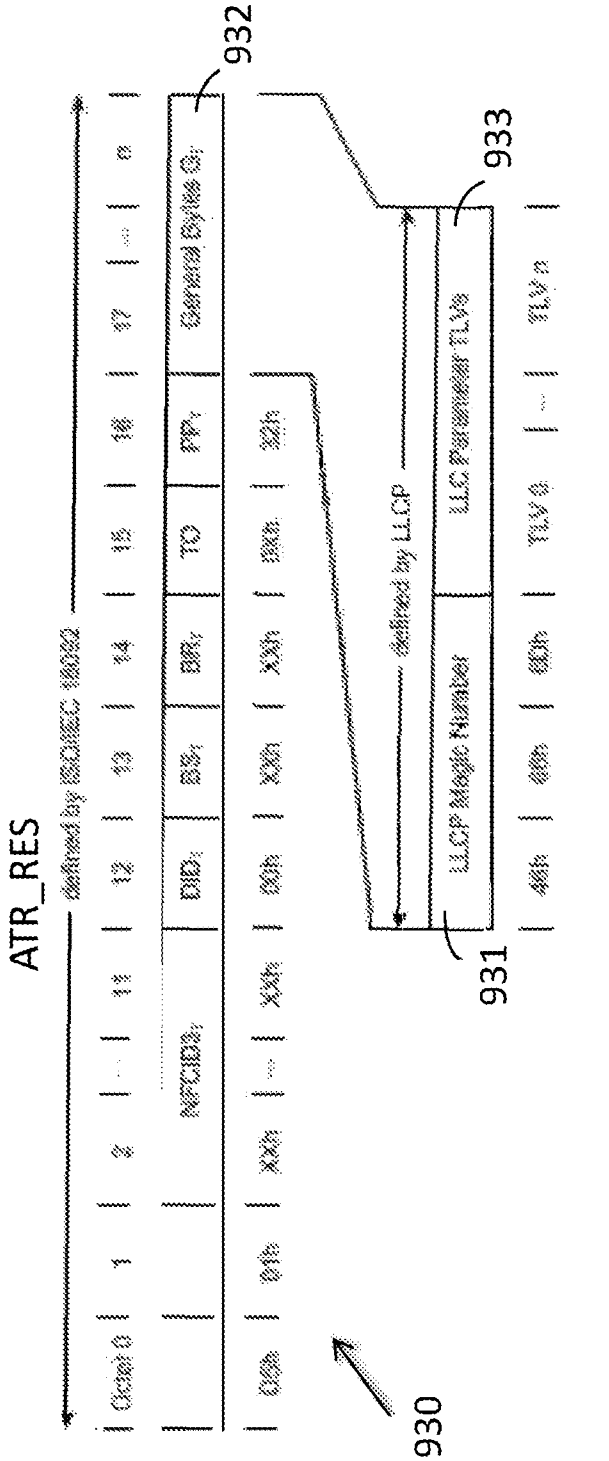
FIG. 13 shows an example of word allocation of an attribute response command according to the protocol shown in FIGS. 9 and 10.

The target can send a corresponding response (ATR_RES 930, FIG. 13) based on the NFC Digital Protocol and the LLCP documents (See NFC Digital Protocol Table 92, LLP Spec Section 6.2.3.2):

| Byte # | Description | Value (hex) |
|---|---|---|
| | | NFC-DEP portion |
| 0 | Length | 1F (31 bytes) |
| 1:2 | Command | D5 01 (ATR_RES, fixed values) |
| 3:12 | NFCID3T | NFCID3T = F3 95 62 DF C3 28 BD 9D 94 E0 |
| 13 | DIDT | 00 |
| 14 | BST | 00 |
| 15 | BRT | 00 |
| 16 | TO | 0E |
| 17 | PPT | 32 (max payload 254 bytes) |
| | | LLCP portion |
| 18:20 | LLCP Magic # | 46 66 6D |
| 21:23 | TLV: Version # | 01 01 11 (ver1.1) |
| 24:27 | TLV: Services | 03 02 00 13 (WKS LLC Link Management) |
| 28:30 | TLV: LTO | 04 01 96 (1.5 sec) |
| 31:42 | TLV: Private | Tap To Pair Data |

Following the initialization and anti-collision procedure defined in [DIGITAL], the Target device can wait until the receipt of the Attribute Request ATR_REQ 920 command. Upon receipt of ATR_REQ 920, the Target can verify that the first three octets 921 of the General Bytes field 922 are equal to the NFC Forum LLCP magic number defined in Section 6.2.2. If the octet sequence is equal to the NFC Forum LLCP magic number, the Target can respond by sending the Attribute Response ATR_RES 930, as defined in [DIGITAL]. The format of the ATR_RES 930 can be as shown in FIG. 29 of the LLP Spec (page 43) and FIG. 13 herein. The Target can include the NFC Forum LLCP magic number in the first three octets 931 of the ATR_RES General Bytes field 932.

All LLC parameters defined in Section 4.5 Table 6 for use in PAX PDUs that are to be exchanged can be included as TLVs 933 beginning at the fourth octet of the ATR_RES General Bytes field 932. The PAX PDU exchange described in the LLC link activation procedure (cf. Section 5.2) need not be used.

Upon receipt of the Attribute Response ATR_RES 930 the Initiator can verify that the first three octets 931 of the General Bytes field 932 are equal to the NFC Forum LLCP magic number defined in Section 6.2.2. If the octets are equal to the NFC Forum LLCP magic number, the Initiator can notify the local LLC component about the MAC link activation completion and can then enter normal operation described in chapter 6.2.5. For example, each transceiver can exchange configuration information for a media communication link using a Bluetooth, a WiFi, or other protocol.

If the first three octets of the General Bytes field are not equal to the NFC Forum LLCP magic number, the link activation can fail. In this case, any further communication between the Initiator and the Target can be terminated and/or reinitiated.

After sending ATR_RES 930 the Target can notify the local LLC component about the MAC link activation completion and can then enter normal operation described in Section 6.2.5. For example, each transceiver can exchange configuration information for a media communication link using a Bluetooth, a WiFi, or other protocol.

If the magic number in the received ATR_REQ cannot be verified, the link activation can fail. In this case, any further communication between the Initiator and the Target can be terminated and/or reinitiated.

Figure 14:
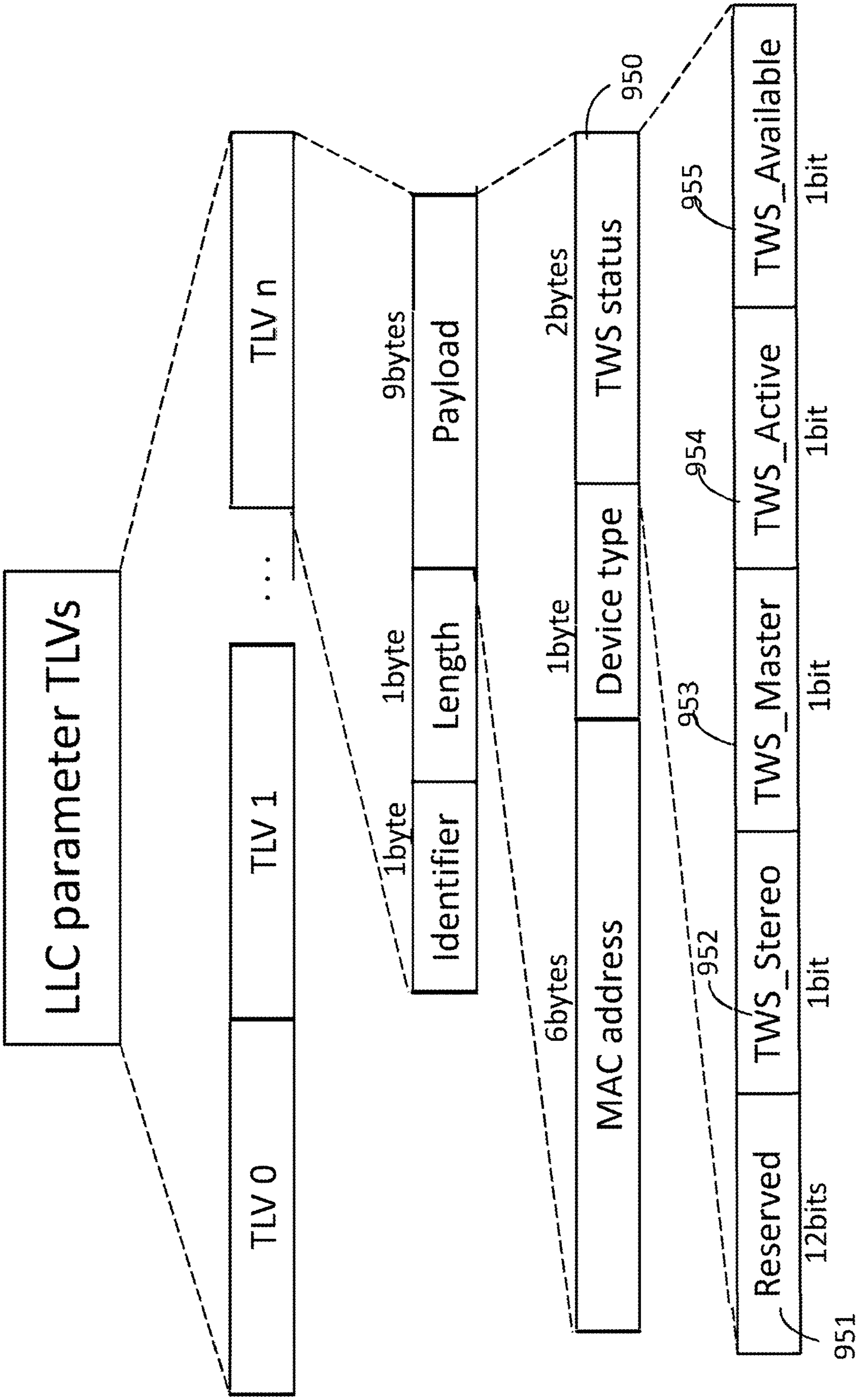
FIG. 14 shows an example of information that can be exchanged using a protocol according to the protocol in FIG. 9.

FIG. 14 shows such information exchange. For example, the configuration information can include, e.g., 12 bits for controlling volume or selecting an audio or other media source. A bit can be used to indicate whether to select a single-channel mode or a multi-channel mode for a given loudspeaker system. Another bit can be used to configure the loudspeaker system as a master (e.g., to receive a media signal from a media source and to transmit a corresponding media signal to a paired loudspeaker system) or as a slave (e.g., to receive a media signal from another loudspeaker system). Another bit can indicate a status of the loudspeaker system. Yet another bit can indicate whether such pairing might be available.

Computing Environments

Figure 15:
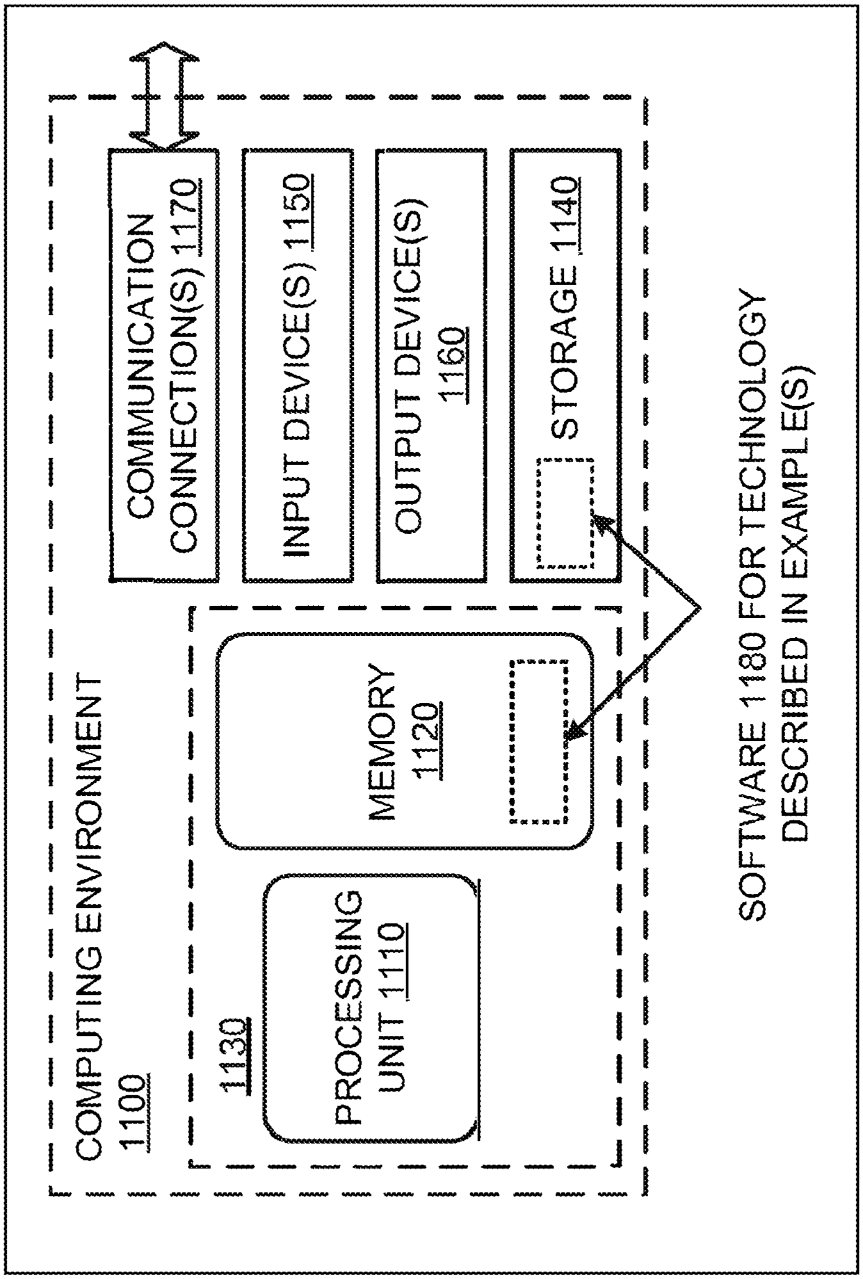
FIG. 15 illustrates a generalized example of suitable computing environment in which described methods, embodiments, techniques, and technologies relating, for example, to control systems, may be implemented.

FIG. 15 illustrates a generalized example of a suitable computing environment 1100 in which described methods, embodiments, techniques, and technologies relating, for example, to control systems, may be implemented. The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 15, the computing environment 1100 includes at least one central processing unit 1110 and memory 1120. In FIG. 8, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, a first wireless transceiver (e.g., an NFC-enabled device or tag), or another device, that provides input to the computing environment 1100. For audio or other media, the input device(s) 1150 may be a sound card or similar device, or a second wireless transceiver, that accepts media input in analog or digital form, or a CD-ROM reader that provides media samples to the computing environment 1100. The output device(s) 1160 may be a display, printer, loudspeaker, CD-writer, wireless transmitter (or transceiver) or another device that provides output from the computing environment 1100.

The communication connection(s) 1170 enable communication over a communication medium (e.g., a connecting network) to another computing entity. The communication medium conveys information such as computer-executable instructions, compressed graphics information, audio or other media information, or other data in a modulated data signal. The data signal can include information pertaining to a physical parameter observed by a sensor or pertaining to a command issued by a controller, e.g., to invoke a change in an operation of a component in a system.

Tangible, non-transitory, computer-readable media are any available tangible and non-transitory media that can be accessed within a computing environment 1100. By way of example, and not limitation, with the computing environment 1100, computer-readable media include memory 1120, storage 1140, communication media (not shown), and combinations of any of the above.

Other Exemplary Embodiments

The examples described herein generally concern automatically configurable wireless systems, with specific, but not exclusive, examples of wireless systems being automatically configurable wireless audio systems. Other embodiments of automatically configurable wireless systems than those described above in detail are contemplated based on the principles disclosed herein, together with any attendant changes in configurations of the respective apparatus and/or circuits described herein. Incorporating the principles disclosed herein, it is possible to provide a wide variety of automatically configurable wireless systems. For example, disclosed systems (e.g., disclosed methods, apparatus, and computer readable media) can be used to automatically configure a keyless entry system, a wireless multi-media system, a wireless biological monitoring system, a wireless gaming system, a wireless control system, etc. Moreover, systems disclosed herein can be used in combination with systems including, inter alia, wired network systems.

In context of other than automatically configurable wireless audio systems, media information (described above in connection with a wireless audio or a wireless video signal) can include other types of information, as well. For example, media information can include biological diagnostic information, observed or detected state variables for use in a control system, and other information that can be encoded and transmitted via a wireless signal.

Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. We therefore reserve all rights to the subject matter disclosed herein, including the right to claim all that comes within the scope and spirit of the foregoing and following.

What is currently claimed:

1. A method, comprising:
- receiving, from a media source, an audio signal at a first device comprising a first speaker system;
- playing audio content corresponding to the audio signal through a speaker of the first device;
- detecting, using transceiver circuitry of the first device, a second device within a communication range of the first device based on a user interaction that brings the first device into the communication range of the second device; and
- providing information associated with the audio signal from the first device to the second device over a wireless link established between the first device and the second device responsive to detecting the second device within the communication range of the first device, for output of the same audio content by the second device.

2. The method of claim 1, further comprising, playing audio content corresponding to the information associated with audio signal from the first device through a speaker of the second device.

3. The method of claim 1, wherein detecting the second device comprises receiving a near field communications signal from the second device at the transceiver circuitry of the first device while the second device is in proximity to the first device.

4. The method of claim 3, further comprising establishing the wireless link using WiFi circuitry of the first device responsive to receiving the near field communications signal.

5. The method of claim 1, wherein the media source comprises a smartphone.

6. The method of claim 1, wherein the media source comprises a remote processing device, and wherein the method further comprises playing the audio content though a second speaker of the second device simultaneously with playing the audio content through the speaker of the first device.

7. The method of claim 1, wherein the media source comprises local storage of the first device.

8. The method of claim 1, wherein the media source is different from the second device, and wherein detecting the second device comprises detecting the second device while playing the audio content corresponding to the audio signal received from the media source.

9. A method, comprising:
- receiving an audio signal at a first device comprising a first speaker system from a media source;
- outputting audio content corresponding to the audio signal through a speaker of the first device;
- detecting, using transceiver circuitry of the first device, a second device in proximity to the first device based on a user interaction that includes bringing the first device into proximity of the second device; and
- switching the outputting of the audio content at the first device from a first mode to a second mode responsive to detecting the second device in proximity to the first device.

10. The method of claim 9, further comprising providing at least one channel of the audio signal from the first device to the second device over a wireless link established between the first device and the second device responsive to detecting the second device in proximity to the first device, for output of the at least one channel of the audio content by the second device.

11. The method of claim 10, further comprising switching the outputting of the audio content at the first device from the second mode to the first mode responsive to again detecting the second device in proximity to the first device.

12. The method of claim 11, further comprising causing switching of the output of the at least one channel of the audio content by the second device to the first mode from the second mode responsive to again detecting the second device in proximity to the first device.

13. The method of claim 11, wherein the first mode comprises a single-channel mode and wherein the second mode comprises a multi-channel mode.

14. The method of claim 9, wherein the first mode comprises a single-zone mode and wherein the second mode comprises a multi-zone mode.

15. The method of claim 9, wherein the media source is different from the second device, wherein detecting the second device comprises detecting the second device while playing the audio content corresponding to the audio signal received from the media source, and wherein switching the outputting of the audio content at the first device from the first mode to the second mode comprises switching the outputting of the audio content from outputting the audio content in the first mode prior to the detecting, to outputting the audio content in the second mode after the detecting.

16. A first device, comprising:

memory; and one or more processors configured to:

receive an audio signal comprising a first speaker system from a media source;

provide audio content corresponding to the audio signal for an output through a speaker of the first device;

detect, using transceiver circuitry of the first device, a second device in proximity to the first device based on a user interaction that includes bringing the first device into proximity of the second device; and switch the output of the audio content at the first device from a first mode to a second mode responsive to detecting the second device in proximity to the first device.

17. The first device of claim 16, wherein the one or more processors are further configured to provide at least one channel of the audio signal from the first device to the second device over a wireless link established between the first device and the second device responsive to detecting the second device in proximity to the first device, for output of the at least one channel of the audio content by the second device.

18. The first device of claim 17, wherein the one or more processors are further configured to switch the output of the audio content at the first device from the second mode to the first mode responsive to again detecting the second device in proximity to the first device.

19. The first device of claim 18, wherein the one or more processors are further configured to cause a switch of the output of the at least one channel of the audio content by the second device to the first mode from the second mode responsive to again detecting the second device in proximity to the first device.

20. The first device of claim 18, wherein the first mode comprises a single-channel mode and wherein the second mode comprises a multi-channel mode.

21. The first device of claim 20, wherein, in the single-channel mode, the first device and the second device are configured to output substantially identical audio content, and wherein, in the multi-channel mode, the first device is configured to output a first-channel signal of the audio content and the second device is configured to output a second-channel signal of the audio content.

22. The first device of claim 16, wherein the first mode comprises a single-zone mode and wherein the second mode comprises a multi-zone mode.

* * * * *